Dec. 5, 1933.  H. A. MANTZ  1,938,187
HEAT REGULATOR
Filed Dec. 26, 1931   2 Sheets-Sheet 1

Inventor:
Harold A. Mantz
By Brown, Jackson, Boettcher & Dienner
Attys

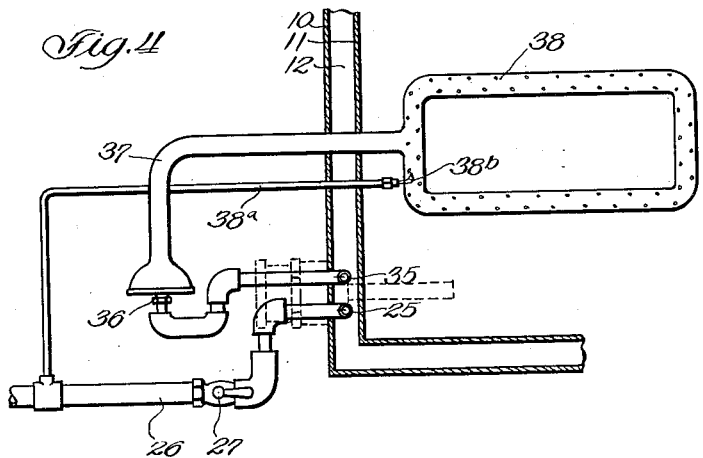
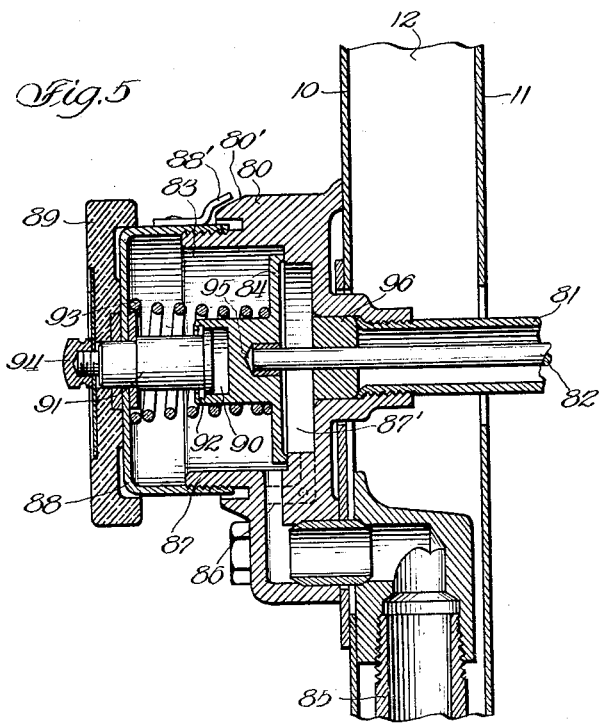

Patented Dec. 5, 1933

1,938,187

UNITED STATES PATENT OFFICE 1,938,187

HEAT REGULATOR

Harold A. Mantz, Milwaukee, Wis., assignor to Milwaukee Gas Specialty Company, Milwaukee, Wis., a corporation of Wisconsin Application December 26, 1931
Serial No. 583,161

19 Claims. (Cl. 236—15)

My invention relates to heat regulators, and more particularly to heat regulators for use in connection with ovens, and the like, although it is to be understood that the invention is not limited in this respect.

Heat regulators of the type to which my invention relates usually comprise means for controlling the gas or other heating medium, selecting means for setting the device for the desired temperature, and a thermally operative device for operating the control device with temperature changes to maintain substantially selected temperatures.

My present invention has for one of its objects the provision of an improved device adapted for installation in an oven, particularly as embodied in modern domestic ranges, as an assembled unit and a device having a novel and compact arrangement of the control valve, thermostatic device and selecting means with respect to each other.

Another object is the provision of a device that can be installed from the outside of the oven and secured in place with a single screw or its equivalent.

Further objects are to provide a device in which the control valve can be opened and reassembled without changing the adjustment of the device; a device which can be used for both left hand or right hand ovens; and a device having a convenient dial setting arrangement, a burner maintenance flame arrangement and adjustment therefor, and pilot flame means and an adjustment for that means.

The thermostatic means for maintaining the temperature for which the device is set, is also adjustable.

The invention is illustrated in the accompanying drawings, in which:

Figure 4 is a more or less schematic plan view, showing the burner and gas supply means therefor with the wall of the oven in horizontal section; and Figure 5 is a view similar to Figure 1, showing another embodiment of the invention.

Figure 1:
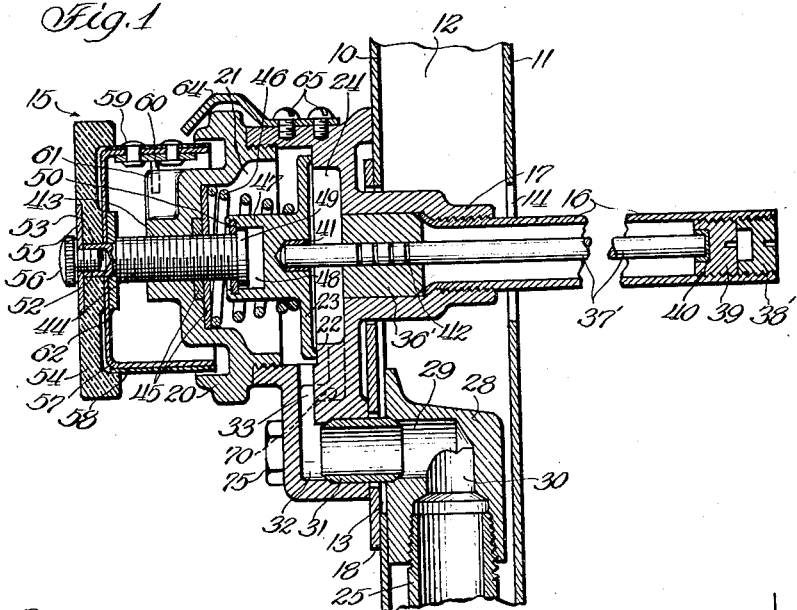
Figure 1 is a fragmentary vertical section of a heat regulator embodying the present invention, showing the thermally operated device positioned in an oven and the regulator assembly mounted upon the wall of the oven.
Figure 2:
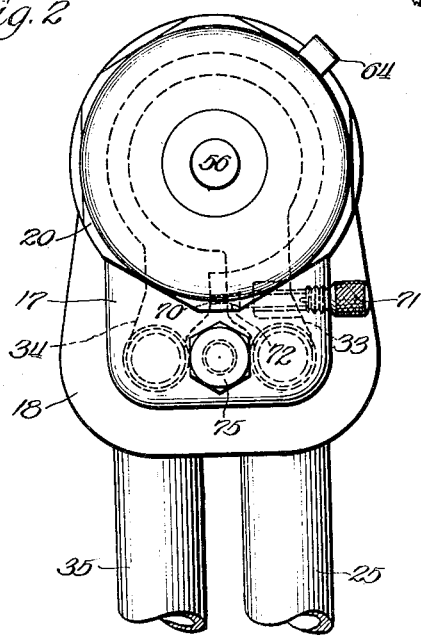
Figure 2 is a front elevational view of the device shown in Figure 1 and with the oven wall omitted.
Figure 3:
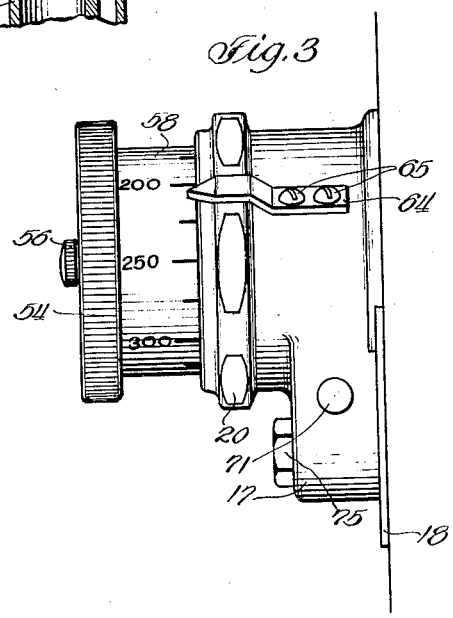
Figure 3 is a side elevational view of that part of the device which is exposed outwardly of the oven wall.

Referring in more detail to Figures 1 to 3, inclusive, the outer oven wall is designated generally by the reference numeral 10. Spaced at a suitable distance inwardly therefrom is a second wall or liner 11, provided for the purpose of preventing too rapid transmission of heat from the interior of the oven to the surrounding atmosphere, and to provide an insulating air chamber 12. The oven wall 10 has a cut-out portion 13 therein of generally rectangular configuration which is adapted to receive the inwardly projecting portion of the heat regulator. The liner 11 has a cutout portion 14 for receiving the thermally operated device of the regulator, which device is adapted to extend into the interior of the oven.

A projecting thermostatic tube 16 passes through the oven wall 10 and liner 11 into the interior of the oven, and is threaded at its outer end into a supporting housing 17. A plate 18 is positioned between the housing 17 and the oven wall 10 for the purpose of spacing the bottom of the housing therefrom, and also for the purpose of closing the cut-out portion 13 of the oven wall 10 around the inwardly projecting parts of the regulator. The housing 17 has an interiorly threaded recessed portion projecting outwardly from the oven wall 10 and adapted to receive the valve plug member 20. This valve plug 20 is threaded into the recessed portion of the housing 17 to secure a gas tight connection therewith, and the plug 20 is interiorly recessed to provide an inlet chamber 21.

The housing 17 has the inwardly projecting flange portion 22 adapted to be suitably machined for the purpose of providing a valve seat for the valve member 23, which may be of the common "mushroom" type of valve. Projecting inwardly from the valve seat 22 is a recessed housing portion 24 which is adapted to serve as an outlet opening for the valve.

As shown in Figures 2 and 4, there is an inlet pipe 25 leading to the control device, this pipe or conduit 25 being connected to a suitable fuel supply, such as the gas manifold or supply pipe 26. The gas supply to the control device is controllable by means of the stem valve 27, which may be of the usual gas cock type. The inlet conduit 25 is threaded at its upper end into a housing 28, disposed in the air space 12 and secured to the inner side of the oven wall 10. This housing 28 has the channels or passages 29 and 30 formed therein, the channel 29 being adapted to receive at its outer extremity a sleeve member 31 which projects through the plate 18 and oven liner 10. The sleeve member 31 opens into an opening 32 in the housing 17. This opening has a channel 33 which leads into the inlet chamber 21 formed between the valve member 23 and the valve plug 20. Thus gas may flow from the supply pipe 26 through valve 27, conduit 25 and channels 30 and 29 to inlet opening 32 and thence to the inlet side of the valve 23.

From the outlet chamber 24 formed in the housing 17 there is a channel 34 (Figure 2) opening to a similar projecting sleeve and thence down through a housing like the housing 28 to an outlet conduit or pipe 35. When the valve is opened, the gas flows past the valve seat 22 into the outlet chamber 24 and thence through the outlet channel 34 of the housing 17 into the outlet pipe 35 and thence through the one gas mixing chamber 36 (Figure 4) into the conduit 37 leading to the oven burner 38, as is well known in the art.

The housing 17 has secured therein a bushing or sleeve member 36' forming a guide member and support for the thermostatic rod 37'. This rod 37' is composed of a thermally responsive metal which has a coefficient of expansion different from that of the tube 16. In the particular embodiment illustrated the coefficient of expansion of the tube 16 is greater than that of the rod 37'. Threaded into the projecting inner end of the tube 16 are a pair of plug members 38' and 39 adapted to seal the end of the tube 16 and the plug 39 forms a support for the rod 37'. The plug member 39 has a recess 40 adapted to receive the end of the rod 37', and the rod 37' has a ferrule and may be securely fastened in the plug member 39. The outer end of the rod 37' projects into a recess 41 in the valve member 23, and has abutting engagement with the outer end of this recess when in an expanded position. Three grooves 42 are provided in the rod 37' for the purpose of preventing passage of gas along the rod and past the sleeve member 36 into the tube 16, these grooves being provided with suitable packing material.

The valve plug 20 has a threaded opening 43 receiving a control stem 44. The interior of the valve plug 20 is recessed to accommodate a pair of washers 45 for forming a gas tight packing between the control stem or rod 44 and the valve plug 20. A spring 46, which may be of the conically coiled type, abuts against the outer washer 45 and passes around the projecting hub 47 of the valve member 23, and abuts the valve member at its inner end. The hub 47 of the valve member 23 is recessed to form an opening 48 adapted to receive the enlarged end 49 of the control rod 44. An annular ring 50 is secured in the hub 47 about the control stem 44 and has abutting contact with the enlarged end 49 of the control stem. The ring is secured in place in a groove formed in the recessed portion 48 of the valve member 23. It has sliding movement over the control stem 44, so that the control stem may be threaded or screwed down into the recess 48, as will be hereinafter described.

The outer end of the control stem 44 has a narrowed portion 52 extending into an opening 53 in a hand wheel 54. The wheel member 54 has a roughened or knurled edge to facilitate turning. A friction washer 55 seats in a recess in the hand wheel 54 and provides a bearing surface for a screw 56 which threads into the outer end of the stem 44 and secures the wheel thereon. A cup shaped member 57 is secured around the control stem 44 interiorly of the hand wheel 54, and has secured thereto a circular dial plate 58 which is held in position by means such as rivets 59. The rivets 59 also secure a stop member 60 to the interior of the cup shaped member 57, which top plate 60 is adapted to engage a projecting web portion 61 on the valve plug 20 for the purpose of limiting the rotation of the hand wheel and associated dial plate.

A second friction washer 62 is positioned about the reduced portion 52 of the control stem 44 and has abutting engagement with the threaded portion of the control stem for the purpose of frictionally holding the cup shaped portion 57 of the dial against the hand wheel 54. The adjusting screw 56 is threaded in the reduced end 52 of the control stem 44, and forces the friction washer 55 against the hand wheel 54 and the friction washer 62 against the cup shaped member 57 and against the hand wheel 54 for the purpose of frictionally engaging these members so that upon rotation of the hand wheel 54 the control stem 44 and the dial 58 will rotate.

By loosening the adjusting screw 56 the hand wheel 54 and the associated dial 58 can be rotated and adjusted to the proper position with reference to the position of the control stem 44. A reference member or indicator 64 is secured to the housing 17 by means of screws 65 for the purpose of indicating the setting of the dial 58.

Referring particularly to Figure 2, there is provided a by-pass 70 between the inlet chamber 33 and outlet chamber 34 of the housing 17. This by-pass 70 is provided to permit a safe minimum quantity of gas to flow to the oven burner for the purpose of preventing the burner from being extinguished unintentionally by the regulator with the valve 27 in open position. Any flow of gas past the valve 27 with the valve 23 closed will be supplied at a restricted rate through the by-pass 70 and to the burner 38. With the burner ignited, the operation of the regulator will regulate the flow of gas to the burner to maintain the temperature for which the selecting device is set. An adjusting screw 71 is threaded into the housing 17 and has the tapered end portion 72 adapted to limit the effective area of the by-pass 70. This screw is adapted to control the quantity of gas passing through the by-pass 70 from the inlet 33 to the outlet 34 of the housing 17.

In installing the control device of my invention, the cut out portion 13 is first formed in the oven wall 10, also the cut out portion 14 in the liner 11. The inlet tube 25 and outlet tube 35 with their associated housing means 28 are next arranged as shown in the space 12 between the oven wall 10 and liner 11.

The completely assembled unit is then ready for mounting. The flange plate 18 is placed in position and the assembled regulator unit is then applied to the oven, the tubing thermally operated part extending into the interior of the oven. After the control valve and associated regulator apparatus including the selecting device and the thermally operated device has been placed in position, a mounting bolt 75 is passed through the housing 17 and through the oven wall 10 and is threaded into the housing 28, clamping the heat regulator assembly to the outer side of the wall 10 and the housing means 28 to the inner side of said wall. It is understood that the inlet sleeve member 31 and the corresponding outlet sleeve member are interposed between the housings 17 and 28 before clamping the housings in place as above described, these sleeve members being clamped tightly in endwise position between the housings in their application to the oven wall.

The single bolt 75 secures the entire regulator device to the oven wall, and for the purpose of disassembling the device, it is only necessary to unscrew this bolt and the entire device can then be withdrawn from the oven wall. This presents both a convenient and reliable means of attaching the unit to the wall, and it eliminates the use of a number of bolts and screws. It provides also a generally neat and trim appearance of the device upon the oven wall.

In operation when the valve 27 is opened the gas flows through the inlet conduit 25 to the inlet chamber 21. A small portion of this gas passes through the by-pass 70, which is controlled by the adjusting screw 71, and into the outlet conduit 35. This small quantity of gas then passes through the mixing head 36 to the burner conduit 37 and to the burner 38, where it is ignited by means of the pilot flame 38b. This quantity of gas preferably is so regulated, by means of the adjusting screw 71, that although it is capable of maintaining a flame over the oven burner 38, it will not maintain a flame suitable for cooking purposes.

In Figure 1, the valve is shown in its closed position. In the operation of the device, the hand wheel 54 is rotated to the left, as viewed in Figure 2, and the control stem 44 is threaded outwardly from the housing 20. This longitudinal movement of the stem 44 causes the head 49 of the control stem to engage the washer 50 of the valve member 23 and to carry the valve member off its seat against the pressure of the spring 46. The distance that the valve is removed from its seat is determined by the rotation of the wheel 54, and the flow of gas to the valve will thus be quantitatively determined by the registry of the temperature markings on the dial member 58 with the indicator 64.

It is to be understood that the pilot 38b will ignite the burner as soon as the gas cock 27 is opened, and that rotation of the wheel 54 to open the valve will result in more gas being admitted to the burner.

If the temperature within the oven should drop to a point below that indicated by the setting of the control stem, the contraction of the tube 16 with respect to the rod 37' would result in the rod being carried to the left, as viewed in Figure 1. The valve member 23 would then be forced further away from its seat against the pressure of the spring 46, and more gas would flow to the burner. As the oven or chamber heats up, due to increased quantity of gas flowing to the burner, there will be a proportionate expansion of the thermally sensitive rod and tube. The tube, expanding at a faster rate than the rod, will tend to withdraw the rod from the valve member, and the spring 46 will therefore tend to force the valve member toward its closed position, being now limited by the engagement of the head 49 with the washer 50.

In this manner the selecting device is adapted for setting the regulator for the temperature desired within the oven and the thermally operated device operates to open or close the valve to maintain substantially the selected temperatures.

It is thus apparent that the valve of the present control device may be thermally controlled by the temperature within the oven to maintain a substantially constant temperature therein. The temperature existing within the oven can be selected as desired, usually extending over a considerable range, such as from 250 degrees to 550 degrees Fahrenheit. Of course, other suitable ranges of temperature may be employed, and the device may be calibrated for other types of ovens, such as enameling ovens or the like.

Calibration of the device is possible because of the adjusting nut 56, and the friction washers 55 and 62 and their cooperating relationship; loosening of the nut permitting the dial member to rotate without rotating the control stem. Thus, a temperature condition in the oven can be accurately ascertained, and by loosening the adjusting nut, the control stem can be adjusted to correspond to this temperature and to bring the proper dial marking in registry with the indicator member. The adjusting nut is then tightened to engage the friction washers with the dial member. I preferably employ a removable dial marking member 58, which may be removed and another dial marking may be substituted therefor when it is desired to use the device in a different type of oven.

For the purpose of cleaning or repairing the valve proper, it is apparent that by unscrewing the valve plug member 20, the entire outer casing, including the hand wheel, dial plate, and control stem, may be removed, and the valve member 23 is then readily accessible. By the removal of these parts, ready access to the valve seat is permitted, and also access to the rod 37', and to the inlet and outlet passages. Further, this removal of the hand wheel, dial plate, and control stem, does not interfere with the regulation of the device and upon rescrewing the valve plug member 20 into the housing 17, the device is immediately in its correct operative position.

Referring now to the embodiment shown in Figure 5, the construction in this embodiment is similar to that in the embodiment of Figure 1 with the exception of the control stem and the associated parts which cooperate therewith. The thermally operated housing 80 of the thermally operated device is shown projecting through the oven wall 10 and having the tube 81 threaded thereinto and extending inwardly into the oven. A thermally responsive rod 82 is positioned in the tube 81, and responds to temperature variations within the oven. The construction and operation of this rod and associated parts is similar to the construction and operation of the corresponding parts of the embodiment of Figure 1. The housing 80 is recessed to provide a valve chamber 83 therein, the valve chamber 83 having positioned therein a valve 84 of the "mushroom" type. The valve 84 is adapted to prevent the gas which flows from the inlet opening 85 leading from the supply pipe and up through the channel 86 to the chamber 83 from entering the outlet chamber 87' when the valve is in closed position. The housing 80 has an outwardly projecting flange portion 87 which cooperates with a member 88 for forming the inlet valve chamber 83. The member 88 is threaded upon the flange 87 of the housing 80 and rotates thereabout upon rotation of the hand wheel 89. The member 88 is provided with a pointer 88' for cooperating with suitable temperature indications formed on the face 80' of the housing, to enable the operator to select the temperature desired within the oven by aligning the pointer 88' with the selected temperature indication.

The valve member 84 is provided with a recess 90, and a control stem 91 is secured to the hand wheel 89, the inner end of the control stem 91 projecting into the recess 90. An annular washer 92 is secured in a groove in the recess 90 and cooperates with the flanged or enlarged inner end of the control stem to prevent withdrawal of the control stem 91 from the recess. A spring 93 is provided for normally maintaining the valve 84 in closed position. An adjusting nut 94 is threaded onto the outer end of the control stem 91 and clamps the hand wheel 89 and member 88 together and to the control stem 91. By loosening the nut 94 the hand wheel 89 and member 88 may be turned or adjusted to different positions with respect to the control stem to cure any discrepancies and maintain the desired calibration. Upon rotation of the hand wheel 89, the member 88 is adapted to thread itself inwardly upon the housing 80, causing the control stem 91 to be moved axially as in the previous embodiment and for the purpose described in connection with that embodiment.

The thermally responsive rod 82 is adapted to be secured in a recess 95 in the valve member 80 and expansion of the tube 81 produces opening of the valve 84. A sleeve member 96 is positioned in the housing 80 for the purpose of providing a gas tight closure about the rod 82 so that no gas will pass from the outlet opening 87 into the tube 81.

The operation of the embodiment of Figure 5 is substantially the same as that of the previous embodiment, except that the dial member threads on the valve housing and completes the closure of that housing instead of having a valve plug member threaded to the housing and the selecting stem threaded in that plug member as in the previous embodiment. The embodiment of Figure 5 also has substantially the same advantages as the previous embodiment of the invention.

I do not intend to be limited to the exact details shown and described, but only insofar as defined by the appended claims.

I claim:

1. The combination with an oven, of a heat regulator therefor, comprising a control device, a thermally operated device including a rod and tube thermostat extending from said control device inwardly into the oven, said rod having direct abutting engagement in said control device to operate said device and maintain substantially selected temperatures, and selecting means having threaded engagement with said regulator and having lost motion connection with said control device for setting said device for different temperatures.

2. In combination, a valve housing, a control valve in said housing, a thermally operated device including a rod and tube thermostat extending from said housing, said rod having direct abutting engagement in said valve to operate said valve and maintain substantially selected temperatures, and selecting means having threaded engagement with said regulator and having lost motion connection with said valve housing for setting said valve for different temperatures.

3. In combination, a valve housing, a control valve in said housing, a thermally operated device extending from said housing and operatively associated with said valve to operate said valve and maintain substantially selected temperatures, selecting means having threaded engagement with said valve housing, a control stem carried by said selecting means and coacting with said valve for setting said valve for different temperatures, and releasable means for varying the position of said selecting means independently of the position of said control stem.

4. In combination, a valve housing, a valve in said housing, a thermally operated device comprising a tube extending from said housing and a rod within said tube and having direct abutting engagement at its outer end in said valve, and selecting means on said valve housing and having lost motion connection with said valve.

5. In combination, a valve housing, a valve in said housing, a thermally operated device comprising a tube extending from said housing, a rod within the tube and having direct abutting engagement at its outer end in said valve, a valve plug threaded to said housing, a selecting device including a drum dial and having a stem threaded in said valve plug and operatively connected with said valve, and releasable means for clamping said drum dial to said stem to provide for adjustment of said dial with respect to said stem.

6. In combination, a valve housing, a valve in said housing, a thermally operated device comprising a tube extending from said housing, a rod within the tube and coacting at its outer end with said valve, a valve plug threaded to said housing, a selecting device having a stem threaded in said valve plug and operatively connected with said valve, a hand wheel for turning said stem, a dial forming drum for indicating the setting of said selecting device and means for clamping said drum to said stem, said means being releasable for adjusting the dial with respect to the selecting means.

7. In combination, a valve housing, a valve in said housing, a thermally operated device comprising a tube extending from said housing, a rod within the tube and having direct abutting engagement at its outer end in said valve, a valve plug threaded to said housing, a selecting device having a stem threaded in said valve plug and operatively connected with said valve, said housing having a fuel inlet and a fuel outlet, and a by-pass in said housing between said inlet and said outlet to prevent complete closing off of the gas supply to said outlet by said thermally operated device.

8. The combination with an oven, of a heat regulator therefor, comprising an assembled unit consisting of a valve housing having a valve therein, a thermally operated device and a selecting device mounted upon said valve housing upon opposite sides of said valve and in precorrelated relation therewith and constituting a unitary assembly adapted for application to the oven in assembled relation, said selecting device being adapted for setting the valve for different temperatures and said valve housing being adapted to be opened and reassembled without changing the adjustment of the regulator.

9. In combination, in a heat regulator, a valve housing, a valve in said housing, a thermally operated device extending from said housing and coacting with said valve, a selecting device having a dial member threaded on said housing, and a stem frictionally engaged with said dial member and having lost motion connection with said valve, said dial member being adapted to be unthreaded from said housing to remove said stem and valve conjointly therefrom, and to be rethreaded on its said housing without altering the adjustment of the regulator.

10. In combination, in a heat regulator, a valve housing means, a valve in said housing means, a thermally operated device extending from said housing means and coacting with said valve, a selecting device having a stem in threaded engagement with said valve housing means and having lost motion connection with said valve, and means for removing said selecting device and said valve conjointly to provide access to the interior of said housing without altering the adjustment of said regulator when said selecting device and said valve are reassembled.

11. In combination, in an oven having an oven wall, a heat regulator comprising a valve housing, a valve in said housing, a thermally-responsive member having abutting engagement against one side of said valve, selecting means having lost motion connection with the opposite side of said valve, and means for conjointly removing said selecting means and said valve from said housing without altering the adjustment of said regulator.

12. In combination, in an oven, a heat regulator comprising a valve housing, a valve in said housing, a thermally-responsive member having abutting engagement against one side of said valve, selecting means having lost motion connection with the opposite side of said valve, said selecting means including a drum threaded onto said housing, said drum being adjustable with respect to said selecting means and providing for movement of said valve upon rotation of said selecting means, said drum providing for conjoint removal of said selecting means and said valve from said housing without altering the adjustment of said regulator.

13. In combination, a valve housing having a valve seat therein, a valve for said seat having an outwardly projecting recessed portion, a control stem for said valve having lost motion connection within said recessed portion, a hand wheel carried at the free end of said stem, a cup-shaped drum member forming a closure for said housing and carried by said stem, friction washers carried by said stem and disposed on opposite side of said drum member, and means carried by said stem providing for adjustment of said drum member independently of said stem without altering their assembled relation.

14. In combination, a valve housing having a valve seat therein, a valve for said seat having an outwardly projecting recessed portion, a control stem for said valve having lost motion connection within said recessed portion, a cup-shaped drum member forming a closure for said housing and carried by said stem, friction washers carried by said stem and disposed on opposite sides of said drum member, and means carried by said stem for engaging said washers with said drum member to secure said stem thereto, said drum member providing for removal of said stem and valve without altering the adjustment of said stem and valve when in assembled position.

15. In combination, a valve housing, a control valve in said housing, spring means tending to close said valve, a rod and tube thermostat extending from said housing and having abutting engagement in said valve, and selecting means including a headed extending spindle having lost motion connection within said valve for moving said valve against said spring means to set said valve for different temperatures.

16. In combination, in a heat regulator, a valve housing having a threaded enclosure member, a valve disposed within said housing, a thermally sensitive member having abutting engagement upon one side of said valve, and selecting means supported by said threaded closure member for adjusting the setting of said valve, said threaded closure member being removable from said housing to provide access to said valve without altering the adjustment of said regulator.

17. In combination, a valve housing having an open side, a valve in said housing, a selecting means therefor including a drum enclosing said open side of said housing and having threaded engagement therewith, and a spindle carried by said drum and engaging said valve for adjusting said valve upon rotation of said drum.

18. In combination, a valve housing having an open side, a valve in said housing, a selecting means therefor including a drum enclosing said open side of said housing and having threaded engagement therewith, a spindle carried by said drum and engaging said valve for adjusting said valve upon rotation of said drum, and releasable friction means providing for rotation of said drum independently of adjustment of said valve.

19. In combination, an oven wall having an opening therein, a lining wall spaced inwardly from said oven wall, a heat regulator including a housing having a control device therein adapted to be applied to said opening, a thermally sensitive device carried by said housing and extending through said wall opening and through said lining wall, said device having abutting engagement within said control device, a pair of conduit coupling members disposed between said walls and adjacent the lower portion of said wall opening, sleeve members carried by said housing extending through said opening and engaging in said coupling members, and a closure plate disposed between said housing and said oven wall for closing said wall opening.

HAROLD A. MANTZ.